United States Patent [19]

Thompson et al.

[11] Patent Number: 4,616,049

[45] Date of Patent: Oct. 7, 1986

[54] SURFACE-MODIFIED ANTIMONY OXIDE PARTICLES

[75] Inventors: Ralph B. Thompson, Oakbrook; Kenneth J. Sienkowski, Downers Grove, both of Ill.

[73] Assignee: PPG Industries, Inc., Pittsburgh, Pa.

[21] Appl. No.: 726,548

[22] Filed: Apr. 24, 1985

[51] Int. Cl.$^4$ .............. C08K 9/06; B32B 15/02; B32B 15/20
[52] U.S. Cl. ............................. 523/212; 428/405
[58] Field of Search ............... 523/212; 428/405

[56] References Cited

U.S. PATENT DOCUMENTS 4,100,075 7/1978 Ashman et al. ............... 252/8.1
4,387,176 6/1983 Frye ................................ 524/268
4,394,469 7/1983 Stratta et al. ................... 523/212

FOREIGN PATENT DOCUMENTS 0065777 12/1982 European Pat. Off. .

OTHER PUBLICATIONS

*Encyclopedia of Polymer Science and Technology*, vol. 12, pp. 472–482, 486–487, 497–499, 519-526, (1970).
Chem. Abs. 84(8)53392v, 1975.
Chem. Abs. 81(12)64334s, 1973.

*Primary Examiner*—Herbert J. Lilling
*Attorney, Agent, or Firm*—George D. Morris

[57] ABSTRACT

Fire retardant compositions comprising organic polymer, organic fire retardant compound and particles of antimony oxide surface-modified with poly(dialkylsiloxane) or condensation residue thereof, often exhibit enhanced physical properties as compared with similar compositions employing untreated antimony oxide particles.

25 Claims, No Drawings

SURFACE-MODIFIED ANTIMONY OXIDE PARTICLES

Particles of antimony oxide, usually in conjunction with one or more organic fire retardant compounds, have been incorporated with organic polymers to provide a composition having improved fire retardant properties as compared with the organic polymer itself. While enhancing the fire retardant properties of the composition, the antimony oxide particles often have an adverse effect on other properties, particularly physical properties such as tensile strength, flexural strength, flexural modulus, impact strength and heat distortion temperature.

Various suggestions have been made in the literature for surface-modification of antimony oxide particles to improve the physical properties of the composition while still enjoying the fire retardant benefits provided by antimony oxide. Notable among these is U.S. Pat. No. 4,394,469 which describes surface-modification of antimony oxide particles with polysiloxanes represented by the formula:

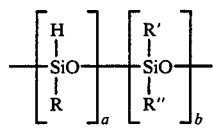

where R, R' and R" may, among others, be alkyl. The sum of a and b is from 2 to 1000, but the patent unequivocally requires that the ratio a/b must be more than 0.5. Indeed, the patent indicates a preference for b to be equal to zero.

It has now been found that particles of antimony oxide may be treated with poly(dialkylsiloxane) to produce surface-modified antimony oxide particles which provide fire retardancy to organic polymer compositions and which provide enhanced physical properties, particularly impact strength and heat distortion temperature, to such compositions as compared to those provided by untreated antimony oxide particles. The poly(dialkylsiloxane) employed in treating the antimony oxide particles according to this invention have substantially no, if any at all, hydrogen bonded directly to silicon atoms and they have substantially no, if any at all, silicon atoms bonded directly to other silicon atoms. They do have, however, a small amount of hydroxyl, methoxy, and/or ethoxy functionality which is essential for their function in the invention.

Accordingly, one embodiment of the invention is particles of antimony oxide surface-modified with poly(dialkylsiloxane) or condensation residue thereof, wherein the poly(dialkylsiloxane) is represented by the formula

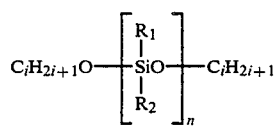

(I)

in which: (a) each $R_1$ and $R_2$ are alkyl groups, (b) the average value of i is in the range of from 0 to 2, and (c) the average value of n is such that the number average molecular weight of said poly(dialkylsiloxane) is in the range of from about 700 to about 5000.

The value of i may vary in the range indicated depending upon whether the terminal groups (i.e., the oxygen-containing groups attached to the first and last silicon atoms of the chain) of individual compounds in the mixture are hydroxyl, methoxy, or ethoxy.

The two terminal groups of any individual molecule may be the same or different. However in mixtures of molecules which are characteristic of the poly(dialkylsiloxanes), the average identities of the two terminal groups may be taken as the same.

When the value of i is zero, the terminal groups of Formula I are hydroxyl. When the value of i is one, the terminal groups are methoxy. When the value of i is two, the terminal groups are ethoxy. Although the value of i will independently be 0, 1, or 2 for any individual terminal group of a particular molecule, the average value of i for mixtures may be any number in the range of from 0 to 2, including numbers which are integers and numbers which are not integers. In many cases, the average value of i is in the range of from 0 to 1. Preferably, the average value of i is zero or one. It is especially preferred that the average value of i be zero. The average value of i may be determined analytically or by a knowledge of the starting materials used to prepare the poly(dialkylsiloxane).

The value of n for any particular compound will be a positive integer, while the average value of n for a mixture of compounds constituting the poly(dialkylsiloxane) may be a positive integer or a positive number which is not an integer. The average value of n is calculated from the number average molecular weight. The number average molecular weight may be found experimentally or it may be calculated from the distribution of individual compounds using the equalities:

$$\overline{M}_n = \frac{\Sigma M_j N_j}{\Sigma N_j} = \frac{\Sigma w_j}{\Sigma m_j}$$

where
$\overline{M}_n$ is the number average molecular weight;
$M_j$ is the molecular weight of molecules of species j;
$N_j$ is the number of molecules of species j;
$w_j$ is the mass, expressed in grams, of molecules of species j; and
$m_j$ is the mass, expressed in gram-moles, of molecules of species j.

While the number average molecular weight of the poly(dialkylsiloxane) is usually in the range of from about 700 to about 5000, it is often in the range of from about 1000 to about 3000. A number average molecular weight in the range of from about 1500 to about 2000 is preferred. Number average molecular weights of about 1700 are especially preferred.

The alkyl groups of the poly(dialkylsiloxane) are generally lower alkyl groups containing from 1 to about 4 carbon atoms. In most cases the alkyl groups are methyl, ethyl, or methyl and ethyl. It is preferred that the alkyl groups be substantially all methyl.

The percent by weight of the terminal groups in the poly(dialkylsiloxane) may be calculated from the formula $$\text{Weight percent terminal groups} = \frac{2805.39i + 3401.46}{\overline{M}_n}$$

Although it is not desired to be bound by any theory, it is believed that the surfaces of antimony oxide particles have hydroxyl groups attached to antimony atoms. When the poly(dialkylsiloxane) is applied to the particles and heated, it is further believed that at least some of the terminal groups of the poly(dialkylsiloxane) condense with at least some of the hydroxyls of the particle surface to form

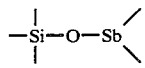

bonds and evolve water and/or alcohol, depending upon the identities of the terminal groups. It is also believed that some of the terminal groups of the poly(dialkylsiloxane) condense with other terminal groups of the same or different poly(dialkylsiloxane) molecule to form siloxane bonds and evolve water and/or alcohol. Ring structures, linear structures (including those of increased molecular weight) and, if some poly(siloxane) having hydroxy and/or alkoxy functionality greater than two is also present, network structures may result.

Whether the antimony oxide particles are at least partially coated with a film or whether the particles exhibit chains or loops of poly(dialkylsiloxane) that extend outwardly from the particles of antimony oxide and into the organic polymer matrix upon compounding with organic polymer is not known. It is believed, however, that

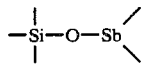

bonding between the particle and the poly(dialkylsiloxane) structure does, at least in part, occur.

The poly(dialkylsiloxanes) of Formula I are themselves well known, and many of them are items of commerce. See, for example, *Encyclopedia of Polymer Science and Technology*, volume 12, John Wiley & Sons, Inc., New York (1970), pages 472–482, 486–487, 497–499, and 519–526, the disclosures of which are incorporated herein by reference.

The particles of antimony oxide to be treated with the poly(dialkylsiloxane) usually have equivalent spherical diameters less than about 11 micrometers, although a small fraction may have equivalent spherical diameters above this value. Often the equivalent spherical diameters are essentially in the range of from about 0.1 to about 10 micrometers. Equivalent spherical diameters in the range of from about 0.3 to about 5 micrometers are preferred. A small fraction of fines, that is, particles having equivalent spherical diameters less than the lower value stated in either range, is frequently present. The equivalent spherical diameter of a particle, as used herein and in the claims, is that determined using a Sedigraph 5000D particle size distribution analyzer (Micromeritics Instrument Corporation) in accordance with the accompanying instruction manual. Briefly, the instrument obtains localized density as the particles settle in a liquid. From this and the settling rate, and assuming the particles are spheres, the equivalent spherical diameters are calculated.

Antimony trioxide and antimony pentoxide are the common antimony oxides and particles of either or both may be used in the invention. Antimony trioxide particles are preferred.

The amount of poly(dialkylsiloxane) or condensation residue thereof remaining on the particles after treatment can vary widely. Ordinarily the poly(dialkylsiloxane) or condensation residue thereof constitutes from about 0.1 to about 15 weight percent of the surface-modified antimony oxide particles. From about 0.5 to about 5 percent by weight is preferred.

A class of poly(dialkylsiloxanes) which is especially useful in the present invention is represented by the formula

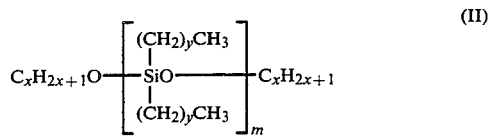

in which: (a) the average value of x is in the range of from 0 to 2, (b) the average value of y is in the range of from 0 to 1, and (c) the average value of m is such that the number average molecular weight of the poly(dialkylsiloxane) is in the range of from about 700 to about 5000.

The average value of x is usually in the range of from 0 to 1. Preferably the average value of x is either zero or one. It is especially preferred that the average value of x be zero.

In any individual molecule, the two alkyl groups attached to any silicon atom may be the same or different, and similarly the alkyl groups attached to different silicon atoms may be the same of different. However in mixtures of molecules which are characteristic of the poly(dialkylsiloxanes), the average identities of the alkyl groups may be taken as the same.

When the value of y is zero, the alkyl groups of Formula II are methyl. When the value of y is one, the alkyl groups are ethyl. Although the value of y will independently be 0 or 1 for any individual alkyl group, the average value of y for a multiplicity of alkyl groups may be any number in the range of from 0 to 1, including integers and fractional numbers. It is preferred that the average value of y be zero. The average value of y may be determined analytically or by a knowledge of the starting materials used to prepare the poly(dialkylsiloxane).

The principles discussed above in respect of the average values of i and n, are also applicable to the average values of x and m, respectively. The ranges of number average molecular weight discussed above are also applicable to the poly(dialkylsiloxane) of Formula II.

The surface-modified antimony oxide particles of the invention may be prepared by admixing antimony oxide particles with the poly(dialkylsiloxane). Uniformity of distribution of the poly(dialkylsiloxane) is favored by the use of high shear and vigorous agitation during mixing. When it is desired to reduce the viscosity of the poly(dialkylsiloxane), inert solvent may be included. Examples of suitable inert solvents include aromatic hydrocarbons such as toluene, xylene, and the like, chlorinated aromatic hydrocarbons such as chlorobenzene and the like, and/or chlorinated aliphatic hydrocarbons such as 1,2-dichloroethane and the like. When used, the inert solvent may be removed from the surface modified particles by evaporation at ambient or elevated temperatures. The relative amounts of antimony oxide particles and poly(dialkylsiloxane) which are admixed may vary considerably, but usually the weight ratio of the poly(dialkylsiloxane) to the antimony oxide particles used in forming the surface-modified particles is in the range of from about 0.1:100 to about 18:100. A weight ratio in the range of from about 0.5:100 to about 6:100 is preferred.

A small amount of ammonia and/or amine may, if desired, be included with the liquid admixed with the antimony oxide particles, or otherwise introduced to the mixture, in order to catalyze the condensation of hydroxyl groups as discussed more fully below. When present, the amount of ammonia and/or amine employed may vary considerably, but preferably from about 0.1 to about 0.2 percent by weight of the antimony oxide particles is used.

After mixing, the treated particles are usually heated at temperatures ordinarily in the range of from about 50° C. to about 250° C. to condense at least some the poly(dialkylsiloxane) with at least some of the surface hydroxyl groups of the particles. In general, the presence of ammonia and/or amine permits the condensation reaction to proceed at lower temperatures than if ammonia and amine are absent. When ammonia and/or amine is present, heating is usually conducted at temperatures in the range of from about 50° C. to about 100° C. From about 60° C. to about 70° C. is preferred. When ammonia and amine are absent, heating is typically conducted at temperatures in the range of from about 160° C. to about 220° C. From about 180° C. to about 200° C. is preferred. The duration of heating may be widely varied, but often heating is conducted from about 1 to about 5 hours. From about 1½ to about 2½ hours is preferred.

Another embodiment of the invention is a composition comprising organic polymer, organic fire retardant compound and particles of antimony oxide surface-modified with poly(dialkylsiloxane) or condensation residue thereof, which surface-modified particles have been earlier described.

The organic polymer may be flammable or nonflammable, but usually it is flammable. Typically the organic polymer is thermoplastic, but it may be thermosetting. The organic polymer may be a homopolymer, a copolymer, a terpolymer, an interpolymer, or a mixture of polymers. Examples of polymers which may be used include acrylonitrile-butadiene-styrene interpolymer or graft polymer, polystyrene, high density poly-ethylene, low density polyethylene, polyesters, polyamides, and polycar-bonates. The preferred organic polymers are acrylonitrile-butadiene-styrene graft polymer, poly(ethylene terephthalate), polypropylene, and polyamides.

The amounts of surface-modified antimony oxide particles which are present in compositions of the invention are subject to wide variation. Ordinarily the weight ratio of the surface-modified particles to the organic polymer is in the range of from about 0.5:100 to about 30:100. In many cases the weight ratio is in the range of from about 1:100 to about 15:100. A weight ratio in the range of from about 1.5:100 to about 10:100 is preferred.

The types of organic fire retardant compounds which may be used in the compositions of the invention may be widely varied. In most, but not all, cases the organic fire retardant compound is halogen-containing organic fire retardant compound. Of these, chlorine-containing organic fire retardant compound and bromine-containing organic fire retardant compound are preferred. Bromine-containing organic fire retardant compound is preferred. Only one organic fire retardant compound or a mixture of such compounds may be employed as desired.

Examples of organic fire retardant compounds which may be used include octabromodiphenyl oxide, decabromodiphenyl oxide, 1,2-bis(tribromophenoxy)ethane, N-methylhexabromodiphenylamine, poly[2,2-bis(bromomethyl)trimethylene carbonate], and any of the usual halogen-containing organic fire retardants.

The amounts of organic fire retardant compound present in the compositions of the invention may also be widely varied. Ordinarily the weight ratio of organic fire retardant compound to organic polymer is in the range of from about 1:100 to about 40:100. In many instances the weight ratio is in the range of from about 2:100 to about 30:100. A weight ratio in the range of from about 4:100 to about 25:100 is preferred.

One or more other materials which increase fire retardancy may optionally also be present in the composition. Examples of such materials include zinc oxide, zinc borate, boric acid, borax, and ferric oxide. The amounts of these materials are also subject to wide variation. When used, they are usually present in the composition of the invention in an amount in the range of from about 0.1 to about 15 percent by weight. An amount in the range of from about 1 percent to about 10 percent by weight is preferred.

The compositions of the invention may optionally contain plasticizers, pigments, dyes, tints, antioxidants, visible light stabilizers, ultraviolet light stabilizers, resinous pigment dispersants or grinding vehicles, and the like.

The listing of optional ingredients discussed above is by no means exhaustive. These and other ingredients may be employed in their customary amounts for their customary purposes so long as they are not antagonistic to good polymer formulating practice.

The compositions of the invention have fire retardant characteristics and find many uses. Typically, they may be extruded into fibers, films or other shapes, or molded, shaped or formed into substantially any form. Many of the compositions may be used as adhesives. Where the polymers of the composition are soluble in solvent or are dispersible in liquid nonsolvents such as water, organic nonsolvent or miscible systems of water and organic liquid, the composition may be employed in coating compositions.

The invention is further described in conjunction with the following examples which are to be considered illustrative rather than limiting, and in which all parts are parts by weight and all percentages are percentages by weight unless otherwise specified.

EXAMPLE I

A solution was formed by admixing 1.38 grams of poly(dimethylsiloxane)diol of number average molecular weight about 1700 and containing about 2 percent hydroxyl by weight (Silicone Fluid F-212; SWS Silicones Corporation) with 100 milliliters of toluene. A one-liter, threenecked flask equipped with a stirrer was charged with 275 grams of antimony trioxide particles having equivalent spherical diameters of from about 0.2 to about 4 micrometers. The solution was added to the antimony trioxide particles and the mixture was stirred. One hundred milliliters of toluene was added to form a fairly thick fluid slurry. The flask was placed in a heated oil bath and the mixture was stirred while the temperature of the oil bath was increased from about 65° C. to about 200° C. Stirring was then continued for 2 hours while the temperature of the oil bath was held in the range of from about 180° C. to about 200° C. Volatile materials were allowed to escape from the flask during the heating. The flask was removed from the oil bath and cooled. The surface-modified particles in the flask after removal of the stirrer weighed 270 grams and contained about 0.5 percent by weight poly(dimethylsiloxane)diol or condensation residue thereof.

EXAMPLE II

Five grams of Silicone Fluid F-212 was admixed with 100 milliliters of toluene to form a solution. A one-liter, three necked flask equipped as in Example I was charged with 250 grams of antimony trioxide particles having equivalent spherical diameters of from about 0.2 to about 4 micrometers. The solution was added to the antimony trioxide particles and the mixture was stirred while heating the flask in an oil bath. As the temperature of the oil bath rose from about 100° C. to about 190° C. and volatile materials were allowed to escape from the flask, a paste formed which was difficult to stir. Stirring was nevertheless continued for 2 hours while the temperature of the oil bath was held at 170° C. to 180° C. and while further volatile materials were allowed to escape. The flask was then removed from the oil bath and cooled. The surface-modified particles in the flask after removal of the stirrer weighed 254.9 grams and contained about 2 percent by weight poly(dimethylsiloxane)diol or condensation residue thereof.

EXAMPLE III

Eleven grams of Silicone Fluid F-212 was admixed with 100 milliliters of toluene to form a solution. A one-liter, three-necked flask equipped as in Example I was charged with 275 grams of antimony trioxide having equivalent spherical diameters of from about 0.2 to about 4 micrometers. The solution was added to the antimony trioxide particles. The flask was placed in a heated oil bath and the mixture was stirred while the temperature of the oil bath was increased from about 120° C. to between 180° C. and 190° C. Stirring was then continued for 2 hours while the temperature of the oil bath was held in the range of from about 170° C. to about 190° C. During heating in the oil bath volatile materials were allowed to escape from the flask. The flask was removed from the oil bath and cooled. The surface-modified particles in the flask after withdrawal of the stirrer weighed 286.2 grams and contained about 4 percent by weight poly(dimethylsiloxane)diol or condensation residue thereof.

EXAMPLE IV

A solution was formed by admixing 22 grams of Silicone Fluid F-212 and 200 milliliters of toluene. A one-liter, three-necked flask equipped as in Example I was charged with 275 grams of antimony trioxide particles having equivalent spherical diameters of from about 0.2 to about 4 micrometers. The solution was added to the antimony trioxide particles. The flask was placed in a heated oil bath and the mixture was stirred while heating in the manner of Example I. Volatile materials were allowed to escape from the flask during heating. The flask was removed from the oil bath and cooled. The surface-modified particles in the flask contained about 7 percent by weight poly(dimethylsiloxane)diol or condensation residue thereof.

EXAMPLE V

A solution was formed by admixing 5.5 grams of dialkoxy-terminated poly(dialkylsiloxane) of number average molecular weight about 1500 (Silicone Fluid F-540; SWS Silicones Corporation) with 100 milliliters of toluene. Silicone Fluid F-540 is dialkoxy-terminated poly(dialkylsiloxane) in which the terminal groups are methoxy and/or ethoxy groups and in which about 3 to about 4 percent by number of the alkyl groups attached to the silicon atoms are octadecyl groups with the remainder being methyl groups. A one-liter, three-necked flask equipped as in Example I was charged with 275 grams of antimony trioxide particles having equivalent spherical diameters of from about 0.2 to about 4 micrometers. The solution was added to the antimony trioxide particles. The flask was placed in a heated oil bath and the mixture was stirred while heating in the manner of Example III. Volatile materials were allowed to escape from the flask during heating. The flask was removed from the oil bath and cooled. The surface-modified particles in the flask after withdrawal of the stirrer weighed 276.7 grams and contained about 2 percent by weight dialkoxy-terminated poly(dialkylsiloxane) or condensation residue thereof.

EXAMPLE VI

A solution was formed by admixing 11.0 grams of Silicone Fluid F-540 with 100 milliliters of toluene. A one-liter, three-necked flask equipped as in Example I was charged with 275 grams of antimony trioxide particles having equivalent spherical diameters of from about 0.2 to about 4 micrometers. The solution was added to the antimony trioxide particles. The flask was placed in a heated oil bath and the mixture was stirred while heating in the manner of Example III. Volatile materials were allowed to escape from the flask during heating. The flask was removed from the oil bath and cooled. The surface-modified particles in the flask after withdrawal of the stirrer weighed 280 grams and contained about 4 percent by weight dialkoxy-terminated poly(dialkylsiloxane) or condensation residue thereof.

EXAMPLE VII

A two-liter, three-necked flask equipped as in Example I was charged with 500 grams of antimony trioxide particles having equivalent spherical diameters of from about 0.2 to about 4 micrometers. The flask was placed in a heated oil bath and the antimony oxide particles were stirred for about 15 to 20 minutes while the temperature of the oil bath was held at 140° C. to 195° C. The stirring caused the antimony trioxide particles to become well fluidized with air. Over a period of 3½ hours, 9.7 grams of Silicone Fluid F-212 was slowly added dropwise from an addition funnel while the temperature of the oil bath was held at 140° C. to 195° C. Upon completion of the addition, the temperature of the oil bath was held at about 195° C. while stirring was continued for 1½ hours. Volatile materials were allowed to escape from the flask during heating. The flask was removed from the oil bath and cooled. The surface-modified particles in the flask after withdrawal of the stirrer weighed 508.7 grams and contained about 2 percent by weight poly(dimethylsiloxane)diol or condensation residue thereof.

EXAMPLE VIII

A series of compositions, each containing 76.34 percent by weight acrylonitrile-butadiene-styrene graft polymer (hereinafter "ABS"), 17.74 percent by weight 1,2-bis(2,4,6-tribromophenoxy)ethane (hereinafter "TBPE", and 5.92 percent by weight antimony trioxide particles (either surface-modified or untreated), was tested for fire retardance and for physical properties. For each of the compositions tested, ABS was introduced into a mixer and melted. A mixture of the antimony oxide particles and the TBPE was added to the melt and the materials were mixed until uniform to produce the composition. After cooling, each composition was chopped into small pieces and injection molded into bars. The bars were tested for flammability in accordance with the procedure of Vertical Burning Test 94, dated Feb. 1, 1974, of Underwriters Laboratories, Inc., and in accordance with Standard Method of Test for Flammability of Plastics Using the Oxygen Index Method, ASTM Standard Method D 2863-70, American Society for Testing and Materials. Five bars of each composition were tested for physical properties. The identifies of the antimony trioxide particles, the results of flammability testing and the results of physical testing are shown in Table 1. The values reported for physical testing are mean values and each is followed by the standard deviation. The untreated antimony trioxide particles had equivalent shperical diameters of from about 0.2 to about 4 micrometers.

TABLE 1

| Antimony Trioxide Particles | Untreated | Example II | Example III | Example V | Example VI |
| --- | --- | --- | --- | --- | --- |
| Tensile Strength, megapascals | 39.921 ± 0.207 | 36.060 ± 0.207 | 35.232 ± 0.138 | 38.817 ± 0.207 | 39.921 ± 0.276 |
| Flexural Strength, megapascals | 74.257 ± 0.276 | 69.223 ± 0.276 | 68.810 ± 0.276 | 71.637 ± 0.345 | 74.325 ± 0.345 |
| Flexural Modulus, megapascals | 2530 ± 21 | 2441 ± 28 | 2482 ± 34 | 2475 ± 14 | 2510 ± 34 |
| Notched Izod Impact Strength, newton-meters/meter | 171.9 ± 19.8 | 214.0 ± 25.1 | 227.9 ± 25.6 | 195.9 ± 18.1 | 176.7 ± 16.0 |
| Heat Distortion Temperature (264 psi; 1820 kPa), °C. | 61.75 | 66.50 | 66.50 | 67.75 | 68.0 |
| Specific Gravity | 1.2858 | 1.2846 | 1.2858 | 1.2884 | 1.2880 |
| Melt Index (Condition G), grams/10 minutes | 2.778 | 2.632 | 2.721 | 2.512 | 2.792 |
| UL-94 Classification | V-2 | V-2 | V-2 | V-2 | V-2 |
| UL-94 After Flame Time, seconds | 6.7 | 6.8 | 1.8 | 1.5 | 2.1 |

EXAMPLE IX

A second series of compositions were prepared and tested for physical properties according to the procedure of Example VIII. The identities of the antimony trioxide particles and the results of physical testing are shown in Table 2.

TABLE 2

| Antimony Trioxide Particles | Untreated | Example I |
| --- | --- | --- |
| Tensile Strength, megapascals | 41.989 | 37.990 |
| Flexural Strength, megapascals | 73.429 | 72.809 |
| Flexural Modulus, megapascals | 2448 | 2537 |
| Notched Izod Impact Strength, newton-meters/meter | 152.7 | 171.3 |
| Heat Distortion Temperature (264 psi; 1820 kPa), °C. | 66.5 | 67.8 |
| Specific Gravity | 1.221 | 1.223 |
| Melt Index (Condition G), grams/10 minutes | 2.63 | 2.74 |

The data of Examples VIII and IX show that the values of Notched Izod Impact Strength and Heat Distortion Temperature were substantially greater for compositions formulated with surface-modified antimony trioxide particles according to the invention than for compositions formulated with untreated antimony oxide particles.

The milling of antimony oxide with poly(ethylene terephthalate) has been observed to often result in decreases in intrinsic viscosity and various physical properties. It is believed that the antimony oxide catalytically causes scission of ester bonds of the poly(ethylene terephthalate) and that formulation of the surface-modified antimony oxide particles of the invention with poly(ethylene terephthalate) will result in more stable compositions.

Although the present invention has been described with reference to specific details of certain embodiments thereof, it is not intended that such details should be regarded as limitations upon the scope of the invention except insofar as they are included in the accompanying claims.

We claim:

1. Particles of antimony oxide surface-modified with poly(dialkylsiloxane) or condensation residue thereof, wherein said poly(dialkylsiloxane) is represented by the formula

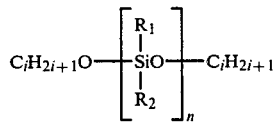

in which
 (a) each $R_1$ and each $R_2$ are alkyl groups,
 (b) the average value of i is in the range of from 0 to 2, and
 (c) the average value of n is such that the number average molecular weight of said poly(dialkylsiloxane) is in the range of from about 700 to about 5000.

2. The particles of claim 1 wherein said particles of antimony oxide are particles of antimony trioxide.

3. The particles of claim 1 wherein the equivalent spherical diameters of said particles of antimony oxide are less than about 11 micrometers.

4. The particles of claim 1 wherein the equivalent spherical diameters of said particles of antimony oxide are essentially in the range of from about 0.1 to about 10 micrometers.

5. The particles of claim 1 wherein said poly(dialkylsiloxane) is represented by the formula

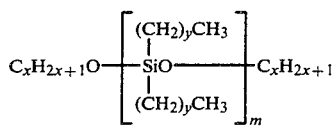

in which
(a) the average value of x is in the range of from 0 to 2,
(b) the average value of y is in the range of from 0 to 1, and
(c) the average value of m is such that the number average molecular weight of said poly(dialkylsiloxane) is in the range of from about 700 to about 5000.

6. The particles of claim 5 wherein the average value of x is in the range of from 0 to 1.

7. The particles of claim 6 wherein the average value of y is zero.

8. The particles of claim 7 wherein the average value of m is such that the number average molecular weight of said poly(dialkylsiloxane) is in the range of from about 1500 to about 2000.

9. The particles of claim 8 wherein said particles of antimony oxide are particles of antimony trioxide having equivalent spherical diameters essentially in the range of from about 0.1 to about 10 micrometers.

10. The particles of claim 5 wherein the average value of x is zero.

11. The particles of claim 10 wherein the average value of y is zero.

12. The particles of claim 11 wherein the average value of m is such that the number average molecular weight of said poly(dialkylsiloxane) is in the range of from about 1500 to about 2000.

13. The particles of claim 12 wherein said particles of antimony oxide are particles of antimony trioxide having equivalent spherical diameters essentially in the range of from about 0.1 to about 10 micrometer.

14. A composition comprising organic polymer, organic fire retardant compound, and particles of antimony oxide surface-modified with poly(dialkylsiloxane) or condensation residue thereof, wherein said poly(dialkylsiloxane) is represented by the formula

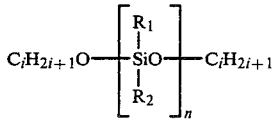

in which
(a) each $R_1$ and each $R_2$ are alkyl groups.
(b) the average value of i is in the range of from 0 to 2, and
(c) the average value of n is such that the number average molecular weight of said poly(dialkylsiloxane) is in the range of from about 700 to about 5000.

15. The composition of claim 14 wherein said particles of antimony oxide are particles of antimony trioxide.

16. The composition of claim 14 wherein said organic fire retardant compound is halogen-containing organic fire retardant compound.

17. The composition of claim 14 wherein said organic fire retardant compound is chlorine-containing organic fire retardant compound.

18. The composition of claim 14 wherein said organic fire retardant compound is bromine-containing organic fire retardant compound.

19. The composition of claim 14 wherein the weight ratio of said organic fire retardant compound to said organic polymer is in the range of from about 1:100 to about 40:100 and wherein the weight ratio of said surface-modified particles to said organic polymer is in the range of from about 0.5:100 to about 30:100.

20. The composition of claim 14 wherein said poly(dialkylsiloxane) is represented by the formula

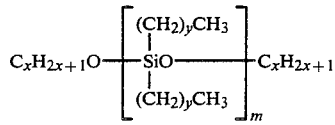

in which
(a) the average value of x is in the range of from 0 to 2,
(b) the average value of y is in the range of from 0 to 1, and
(c) the average value of m is such that the number average molecular weight of said poly(dialkylsiloxane) is in the range of from about 700 to about 5000.

21. The composition of claim 20 wherein the average value of y is zero.

22. The composition of claim 21 wherein said organic polymer is acrylonitrile-butadiene-styrene graft copolymer.

23. The composition of claim 21 wherein said organic polymer is poly(ethylene terephthalate).

24. The composition of claim 21 wherein
(a) said organic fire retardant compound is bromine-containing organic fire retardant compound,
(b) said particles of antimony oxide are particles of antimony trioxide having equivalent spherical diameters essentially in the range of from about 0.1 to about 10 micrometers,
(c) the average value of m is such that the number average molecular weight of said poly(dialkylsiloxane) is in the range of from about 1500 to about 2000,
(d) the weight ratio of said organic fire retardant compound to said organic polymer is in the range of from about 1:100 to about 40:100, and
(e) the weight ratio of said surface-modified particles to said organic polymer is in the range of from about 0.5:100 to about 30:100.

25. The composition of claim 24 wherein the average value of x is zero.

* * * * *